(12) United States Patent
Alsup

(10) Patent No.: US 11,870,554 B1
(45) Date of Patent: Jan. 9, 2024

(54) ENHANCED ETHERNET TIMESTAMPING ON RGMII USING EXISTING DLL

(71) Applicant: Analog Devices, Inc., Wilmington, MA (US)

(72) Inventor: Andrew David Alsup, Albuquerque, NM (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 17/930,201

(22) Filed: Sep. 7, 2022

(51) Int. Cl.
*H04J 3/06* (2006.01)

(52) U.S. Cl.
CPC .......... *H04J 3/0667* (2013.01); *H04J 3/0682* (2013.01)

(58) Field of Classification Search
CPC ...... H04J 3/0635; H04J 3/0638; H04J 3/0658; H04J 3/0661; H04J 3/0667; H04J 3/0682; H04L 7/0016; H04L 7/0037
See application file for complete search history.

(56) References Cited

U.S. PATENT DOCUMENTS

| | | | | |
|---|---|---|---|---|
| 7,251,256 B1 * | 7/2007 | Barry | .................... | H04J 3/0658 370/503 |
| 7,545,794 B2 * | 6/2009 | Loukianov | ......... | H04N 21/4305 370/503 |
| 8,184,651 B2 * | 5/2012 | Chan | ...................... | H04L 49/30 370/419 |
| 8,208,815 B1 * | 6/2012 | Chiang | .............. | H04Q 11/0067 398/155 |
| 8,571,068 B2 * | 10/2013 | Fourcand | .............. | H04J 3/0667 370/498 |
| 8,699,514 B2 * | 4/2014 | Huff | .................. | H04L 12/40169 370/465 |
| 8,811,554 B2 * | 8/2014 | Furtner | ................. | H04L 7/0338 375/376 |
| 8,934,506 B2 * | 1/2015 | Lee | ....................... | H04J 3/0697 370/503 |
| 9,391,924 B2 * | 7/2016 | Alsup | ................. | H04L 49/3036 |
| 9,955,446 B2 * | 4/2018 | Zhang | ................. | H04W 56/004 |
| 2013/0300475 A1 * | 11/2013 | Kurd | ........................ | G06F 1/06 327/158 |
| 2019/0273571 A1 * | 9/2019 | Bordogna | ............... | H04J 3/073 |

* cited by examiner

*Primary Examiner* — Alpus Hsu
(74) *Attorney, Agent, or Firm* — Schwegman Lundberg & Woessner, P.A.

(57) ABSTRACT

A network node device of an area network includes physical layer (PHY) circuitry configured to transmit and receive frames of data via a communication link of the communication network; medium access layer (MAC) circuitry; a receive interface between the PHY circuitry and the MAC circuitry, and timestamp circuitry. The receive interface includes a receive clock signal and a DLL. The timestamp circuitry is configured to produce multiple sample signals derived from the receive clock signal using the DLL and a local clock signal of the network node, and produce a timestamp offset using the multiple sample signals. The timestamp offset is representative of an instantaneous phase offset between a local clock of the network node and a local clock of a neighbor node of the network node.

20 Claims, 7 Drawing Sheets

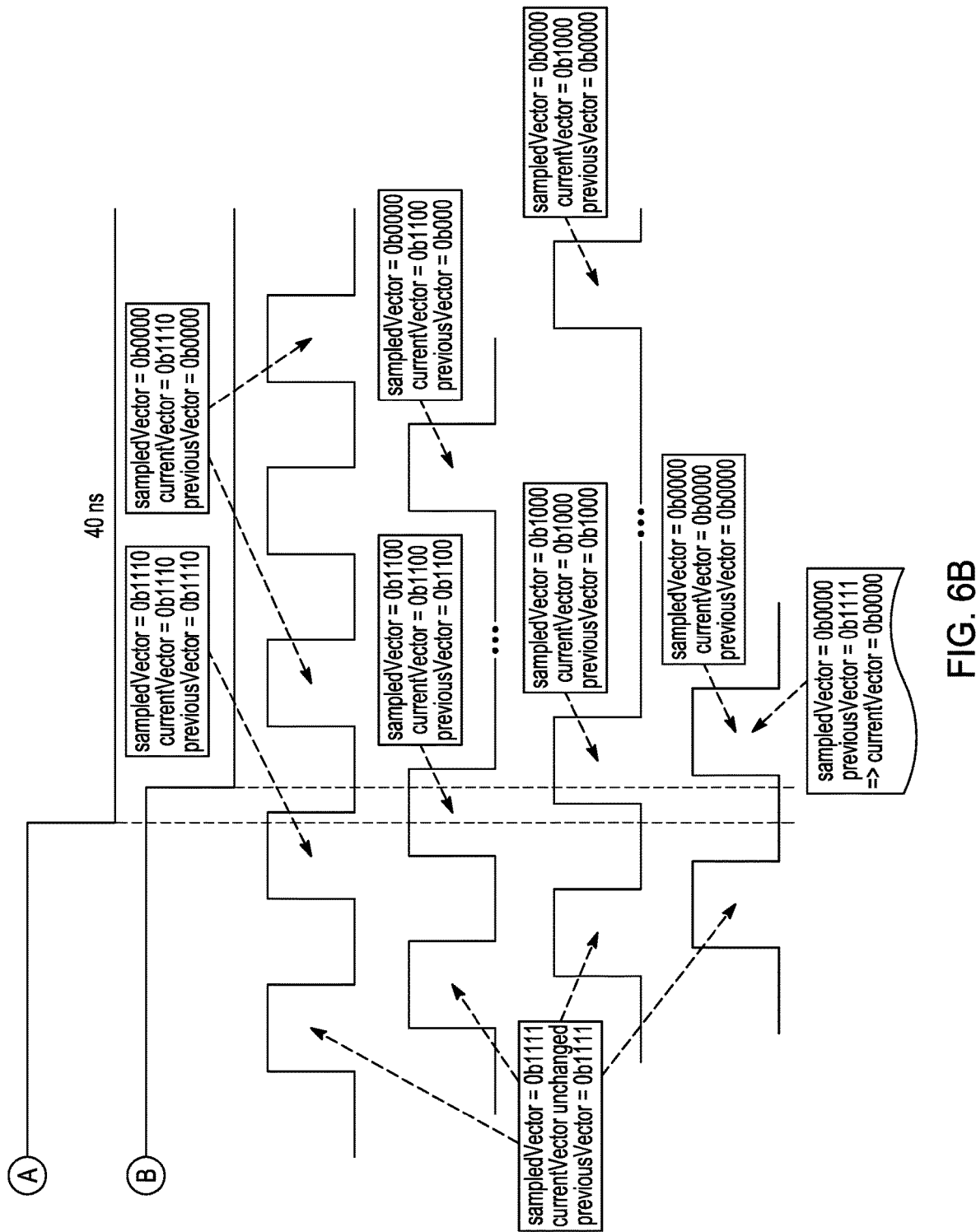

US 11,870,554 B1

ENHANCED ETHERNET TIMESTAMPING ON RGMII USING EXISTING DLL

FIELD OF THE DISCLOSURE

This document relates to switched networks, and in particular to clock synchronization among nodes of the networks.

BACKGROUND

An area network (e.g., a wide area network (WAN) or a local area network (LAN)) is comprised of multiple network nodes. Information can be communicated among the nodes of the network by sending packets of data according to a protocol, such as an Ethernet protocol for example. Area networks can be distributed and include many network nodes that need to exchange time-sensitive data. A challenge is to get the nodes of the network to work in synchronization together. A synchronized network helps guarantee that the data distributed among the network nodes is all the same age, or that the network nodes know the age of the data distributed among the nodes.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 6A-6B illustrate signal waveforms associated with a 100Base-TX type physical layer.

DETAILED DESCRIPTION

As explained previously herein, it is a challenge to get the nodes of a distributed area network to work in synchronization together. One approach to achieve synchronization is a Precision Time Protocol (PTP). In PTP, subordinate nodes synchronize their time to a grand master (GM) node. The subordinate nodes periodically exchange delay measurement frames to calculate network delays, and receive and forward synchronization frames from the GM node to calculate and correct synchronization error. These timing frames include timestamps that are used by the network nodes to calculate propagation delays, relative local clock frequencies, and synchronization offsets. The propagation delays are used to calculate peer delays and synchronization parameters. The subordinate nodes may use the timestamps to calculate the time difference between the GM clock and the local clock of the subordinate nodes. The subordinate nodes may use the calculated time difference to adjust their local clocks to converge with the GM time.

A network node includes a Physical layer (PHY) and a Medium Access Control layer (MAC). The specific timing of the actual timestamps sent by a network node is with respect to the internal local clock of the network node. This local clock operates the MAC and any syntonized clock hardware of the network node. The messages that are being timestamped are received and transmitted over the network according to communications clocks. The communications clocks may or may not have any common source with the local clock of a network node, depending on the specifics of the PHY, the configuration of the PHY, and the design of the board that includes the PTP instance.

Improving accuracy of timestamping in time sensitive or time-critical systems may be desirable as time-sensitive systems grow in complexity. For example, a network topology in factory automation applications may be a line topology with up to 64 bridges linked in a daisy-chain fashion to forward time-critical control and status traffic among the connected nodes. Synchronization is critical for both the time sensitive network timing and the real-world applications managed by the network nodes (e.g., motor control, actuators, sensors, etc.). Each bridge in the line introduces some error into the synchronization quality and improved timestamping can be used to reduce that error contribution.

Improvement in accuracy of timestamping by a network node is dependent on the quality of timestamping by its neighboring nodes. For example, if a link neighbor of a network node timestamps transmitted frames with a 40 nanosecond (40 nsec) accuracy, the resulting error applies to the quality of the timestamps captured locally by the network node in terms of calculating peer delay or sync capture time. To provide maximum improvement in accuracy, increases in timestamp precision should serve to improve the precision of timing with respect to the clock or clocks used by the PTP stack.

Figure 1:
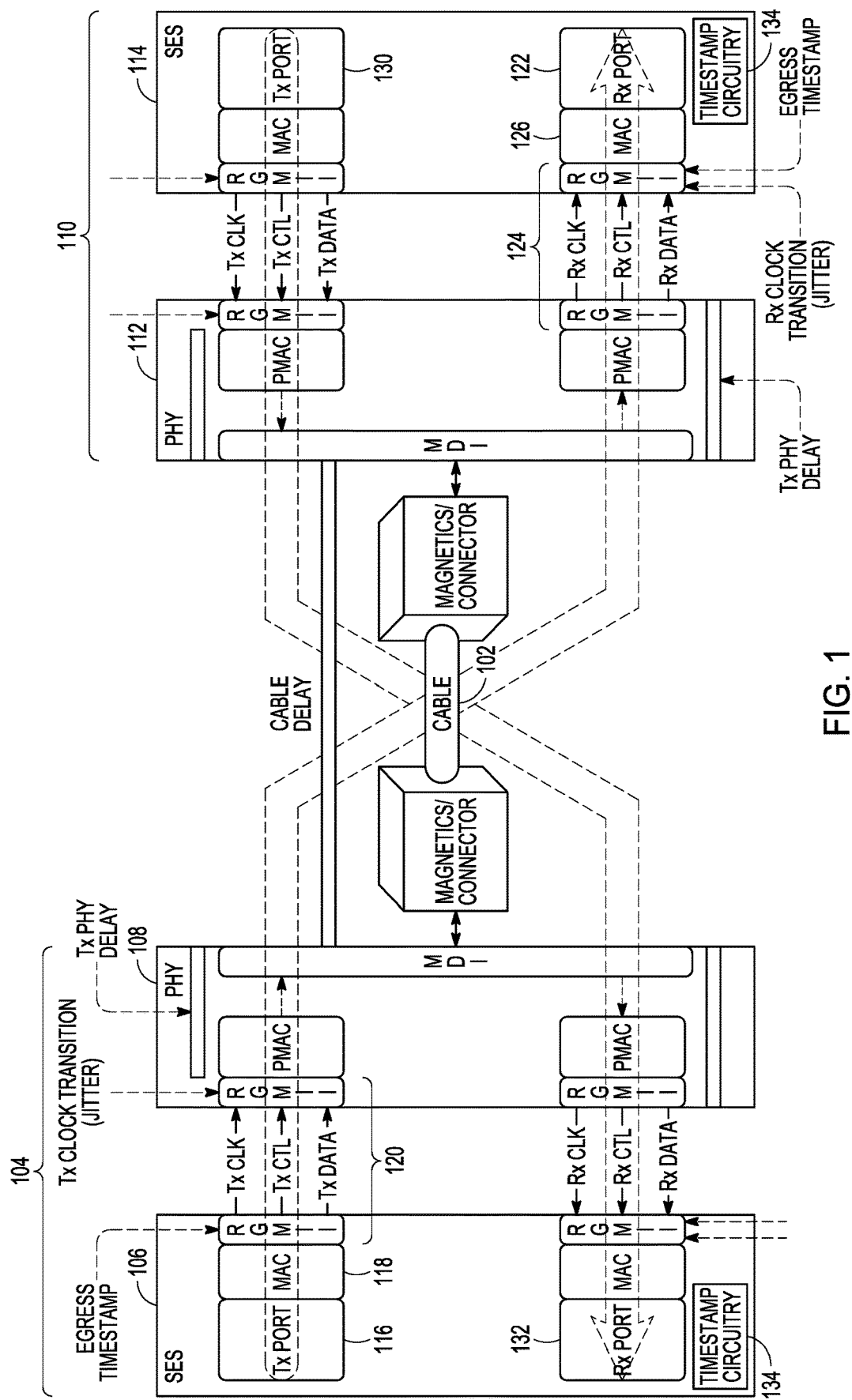
FIG. 1 is a block diagram of a portion of an example of an area network.

FIG. 1 is a block diagram of a portion of an example of an area network. The example includes two neighbor network nodes connected by a communication link of the network (e.g., cable 102). Each network node includes a switch portion, or switch, and a physical layer (PHY). The PHY includes a medium dependent interface (MDI) to the communication link and transmits and receives frames of data via the communication link.

The network node 104 on the left includes switch 106 and PHY 108. The network node 110 on the right includes switch 144 and PHY 112. Each network node includes a transmit port (Tx Port) and a receive port (Rx Port). The Tx port 116 of network node 104 transmits information to the PHY 108 of network node 104 using medium access control layer MAC 118 and reduced gigabit media independent interface (RGMII) 120. The PHY 108 sends the information over the communication link to the PHY 112 of network node 110. The Rx Port 122 of network node 110 receives the information via the RGMII 124 and MAC 126 of network node 110. Information in the other direction flows from Tx Port 130 of network node 110 to Rx Port 132 of network node 104.

Each neighbor node uses a timestamp from the other neighbor node to improve timing, and each provides a timestamp to its neighbor. The timing information included in timing frames (e.g., delay timing frames and synchronization frames) can be used to determine the offset in the local clock of the neighbor nodes. This offset can be added to the timestamp to improve timestamp accuracy (e.g., by being added to the least significant nibble of the timestamp). To improve timestamp precision, a gigahertz clock could be used to sample the timing of the neighbor, but this would consume power. To keep power consumption low, it is desirable to keep the frequencies of the clock signals low.

An improved approach is to use sample clocks generated from the receive clock signal (Rx Clk) of the RGMII 124 to sample the timing of the neighbor node. Each of the neighbor nodes includes timestamp circuitry 134. The receive side of the switch of a network node is driven by the PHY. This includes the receive clock which is driven continuously by the PHY. The internal local clock of the network node may be 125 megahertz (125 MHz). The timestamp circuitry 134 uses the local internal clock to produce multiple clock samples derived from the receive clock signal of the RGMII 124. The clock samples are used to produce a timestamp offset. The timestamp offset is representative of the instantaneous phase offset between a local clock of the network node and a local clock of its neighbor node, which are clocks used to generate timestamps. The timestamp offset can be included in a timing frame by a process running on the network node. For example, the MAC circuitry of the transmit side of the network node may include the timestamp offset in the timestamp of a synchronization frame sent to the neighbor node, and the neighbor node may adjust its timing using the timestamp.

Figure 2:
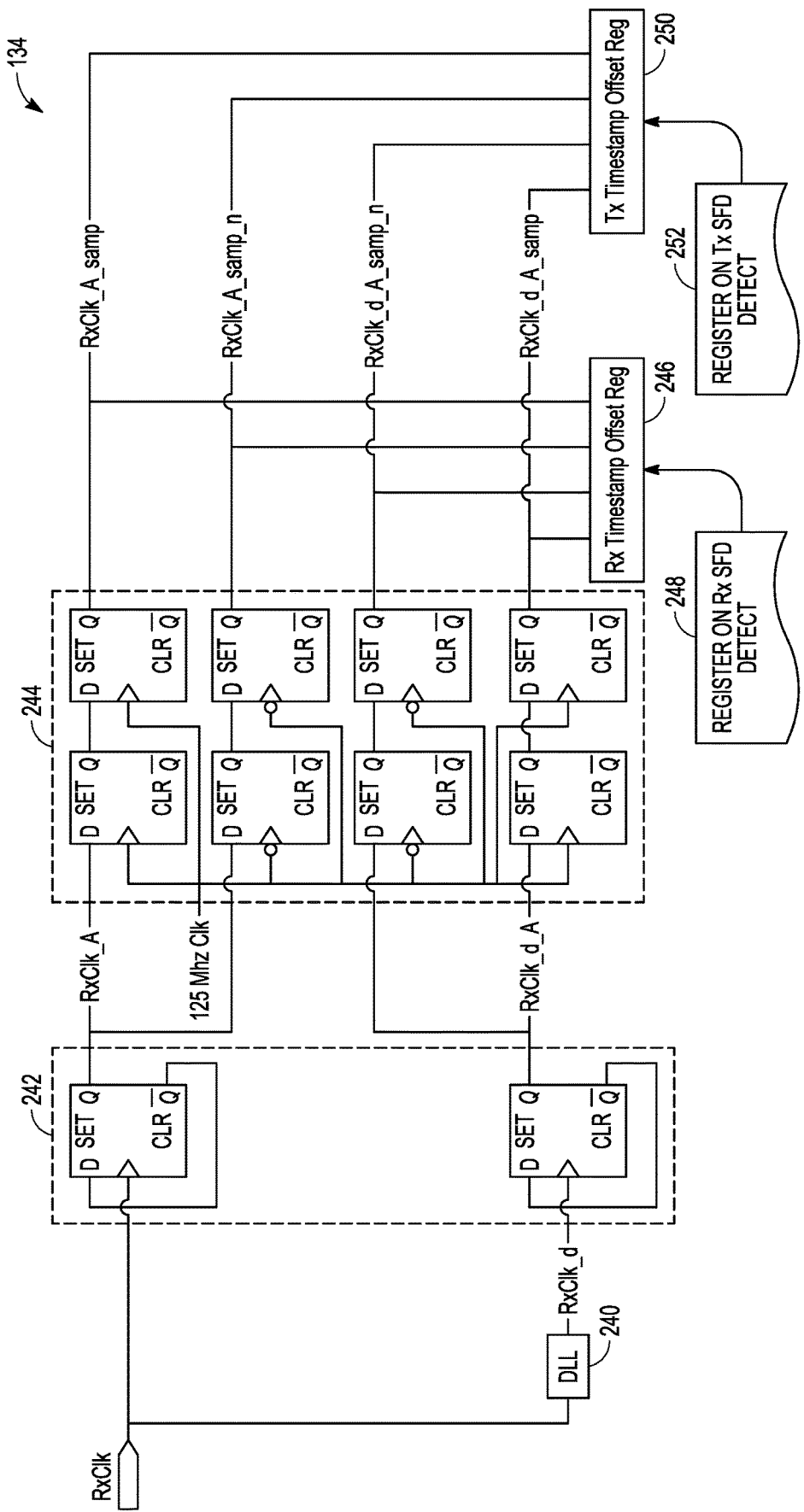
FIG. 2 is a circuit diagram of an example of timestamp circuitry of a network node.

FIG. 2 is a circuit diagram of an example of timestamp circuitry 134 of a network node (e.g., network node 110 in FIG. 1) that produces a timestamp offset. The timestamp circuitry 134 receives the receive clock (RxClk) signal from the RGMII 124 of the network node. The RGMII 124 includes a delay locked loop circuit (DLL) 240 that produces a delayed receive clock signal RxClk_d. The delay added to RxClk has a nominal period of two nanoseconds (2 nsec) and applies to both the rising and falling edges of RxClk. The RxClk and RxClk_d signals are fed to a first set of flip-flops 242 to produce a slowed receive clock signal RxClk_A and a slowed-delayed receive clock signal RxClk_d_A. If the RxClk signal has a 125 MHz frequency, RxClk_A and RxClk_d_A have a reduced frequency of 62.5 MHz.

The local clock signal of the network node may have the same frequency as the RxClk signal (e.g., 125 MHz). The slowed signals RxClk_A and RxClk_d_A are sampled on both the rising and falling edge of the internal 125 MHz clock signal using metastability flip-flops 244. Each edge (rising and falling) on the outputs of the metastability flip-flops 244 represents a rising edge on the incoming signal. The result is sample signals RxClk_A_samp, RxClk_A_samp_n, RxClk_d_A_samp, and RxClk_d_A_samp_n produced from the RxClk and RxClk_d signals, where the "n" signifies an inverted signal. The sample signals have a 4 nsec resolution. The combination of the sample signals with the original and the delayed input provides an additional 2 nsec of resolution.

The sample signals are used to produce a timestamp offset. The timestamp offset can be either a receive timestamp offset or a transmit timestamp offset. To produce a receive timestamp offset, the sample signals are fed to a receive timestamp offset register 246. The timestamp circuitry 134 includes logic circuitry 248 that captures the state of the RxClk_A_samp, RxClk_A_samp_n, RxClk_d_A_samp, and RxClk_d_A_samp_n signals the next clock after a receive Start_mPacket Delimiter command (Rx SMD) is detected.

Capturing the state of the sample signals in the receive timestamp offset register 246 produces a coded vector of four bits (or nibble) in the register. The value of the coded vector captured in the register is a timestamp offset that can be included in the least significant nibble of a timestamp.

Both rising and falling edges of RxClk_A and RxClk_d_A are used to calculate the timestamp offset. This generates two possible measurements for each error offset, yielding eight valid coded vector combinations for four offset estimate results.

Figure 3:
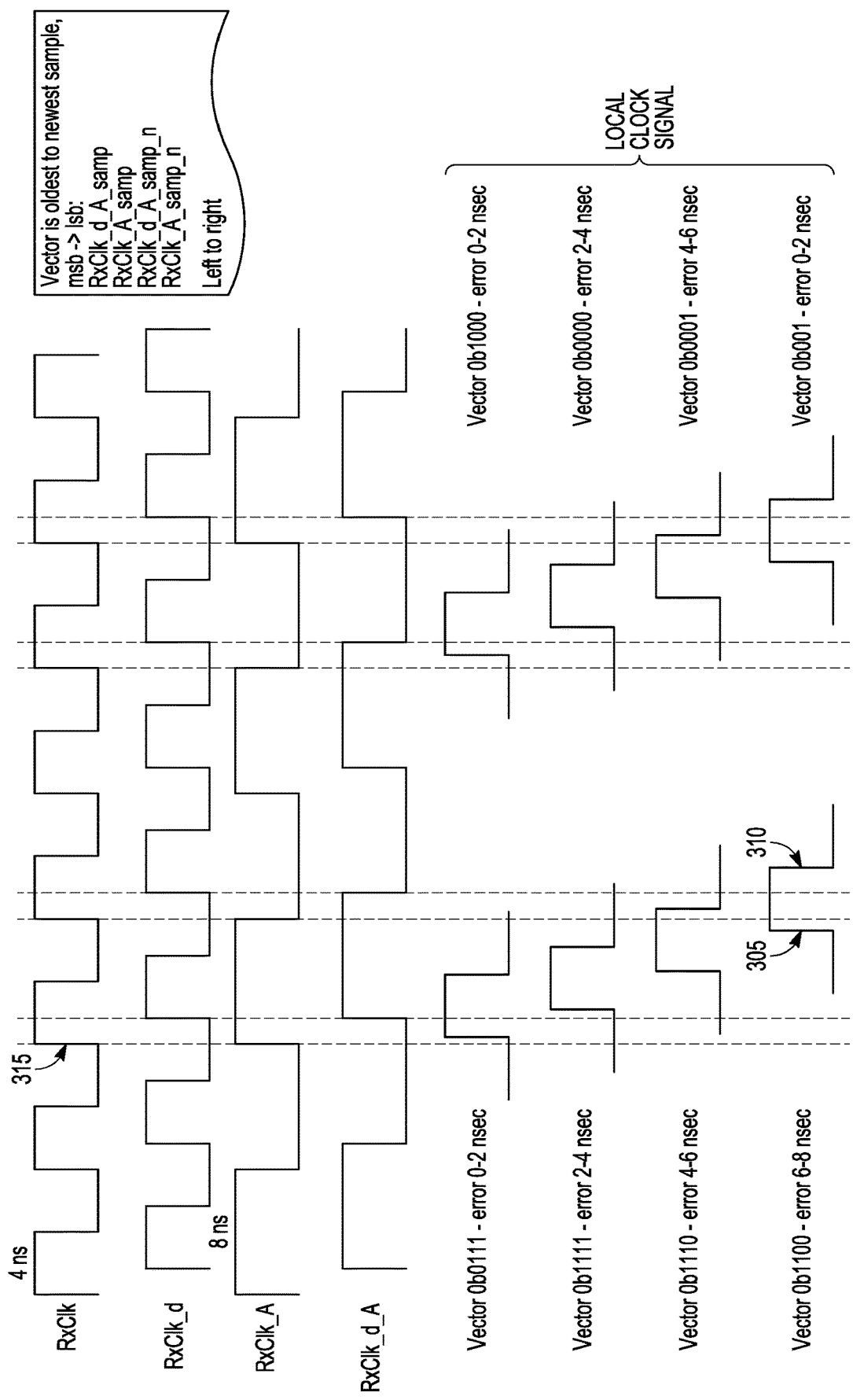
FIG. 3 is an illustration of sampling signals to produce a timestamp offset.

FIG. 3 is an illustration of the sampling of the RxClk_A and RxClk_d_A signals. The signal waveforms RxClk, RxClk_d, RxClk_A, and RxClk_d_A signals are shown at the top of FIG. 3. Below the signal waveforms are waveforms of the internal local clock signal of the network node for eight different error offsets of the local clock signal from the RxClk signal. Also shown are the eight valid coded vector combinations corresponding to eight different error offsets.

In the lower part of FIG. 3, the vertical lines dropped from the RxClk and RxClk_d waveforms indicate the values that will be sampled on the edges of the internal clock. These values will result in one of eight coded vectors being sampled in a timestamp offset register. Each coded vector represents a particular alignment of the internal 125 MHz clock with the receive clock input RxClk and delayed receive clock input RxClk_d. Because there are four bits to the coded vector, there are sixteen possible vector values, but only eight of the possible vectors are valid coded vector values. The other eight values are invalid. The eight valid coded vectors are 0b0111, 0b1111, 0b1110, 0b1100, 0b1100, 0b1100, 0b1100, and 0b1100.

As an example, in the figure, the lower clock pulse labeled with "Vector 0b1100" represents a particular alignment of the internal local clock with the RxClk signal and the RxClk_d signal. On the rising edge 305 of the internal local clock, the signals RxClk_A and RxClk_d_A are high or "1". On the falling edge 310 of the internal local clock, RxClk_A and RxClk_d_A are low or "0". This corresponds to the Vector 0b1100. A comparison of the rising edge 315 of the RxClk and the rising edge 305 of the internal local clock shows that the corresponding error offset for Vector 0b1100 is 6-8 nsec. It should be noted that the inverse vector "Vector 0b0011" is a valid vector value that also corresponds to an error offset of 6-8 nsec.

Table 1 below lists the eight valid coded vectors, their corresponding timestamp adjustment, and the eight invalid coded vector values.

TABLE 1

| t − 2 | t | t + 2 | t + 4 | Corresponding offset from internal 125 MHz clock | Timestamp Adjustment | Comment |
|---|---|---|---|---|---|---|
| 0 | 0 | 0 | 0 | 2-4 nsec offset | +3 nsec | Valid |
| 0 | 0 | 0 | 1 | 4-6 nsec offset | +5 nsec | Valid |
| 0 | 0 | 1 | 0 | | | Invalid |
| 0 | 0 | 1 | 1 | 6-8 nsec offset | +7 nsec | Valid |
| 0 | 1 | 0 | 0 | | | Invalid |
| 0 | 1 | 0 | 1 | | | Invalid |
| 0 | 1 | 1 | 0 | | | Invalid |
| 0 | 1 | 1 | 1 | 0-2 nsec offset | +1 nsec | Valid |
| 1 | 0 | 0 | 0 | 0-2 nsec offset | +1 nsec | Valid |
| 1 | 0 | 0 | 1 | | | Invalid |
| 1 | 0 | 1 | 0 | | | Invalid |
| 1 | 0 | 1 | 1 | | | Invalid |
| 1 | 1 | 0 | 0 | 6-8 nsec offset | +7 nsec | Valid |
| 1 | 1 | 0 | 1 | | | Invalid |
| 1 | 1 | 1 | 0 | 4-6 nsec offset | +5 nsec | Valid |
| 1 | 1 | 1 | 1 | 2-4 nsec offset | +3 nsec | Valid |

The 4 bits of a vector represent samples of the incoming RxClk at 2 nsec intervals. The organization of the flip-flops and their clocks in the circuit of FIG. 2 means that the rising edge samples are taken 8 nsec before the timestamp offset register (246 or 250) is loaded, while the falling edge flops are loaded 4 nsec before the timestamp offset register is loaded.

If a timestamp sent by a network node has a specific number of bits, the 4-bits of the vector can be the least significant 4-bits of the timestamp and can be thought of as an offset with respect to the higher order bits of the timestamp that the internal local clock is captured on. If the upper bits of the timestamp are captured at time "t", the offset of the 4-bits of the vector is with respect to time t. If the 4-bits of the vector are captured on the clock previous to time t, the value of the coded vector represents the following:

The rising edge sample on RxClk_d_A represents the state of RxClk at time t−2 nsec.
The rising edge sample on RxClk_A represents the state of RxClk at time t nsec.
The falling edge sample on RxClk_d_A represents the state of RxClk at time t+2 nsec.
The falling edge sample on RxClk_A represents the state of RxClk at time t+4 nsec.

The coded vector captured in the timestamp offset register 246 can be used to generate an offset added to the measured timestamp to give the desired precision. By centering the timestamp adjustment in the error range, an actual precision of +/− 1 nsec can be achieved. The capture of the timestamp and the timing of the capture of the coded vector will have the timing relationship described above.

Returning to FIG. 2, the same mechanism can be used to measure the error in the clocks of the transmit path of the network node. To produce a transmit timestamp offset, the sample signals may be fed to a transmit timestamp offset register 250. The timestamp circuitry 134 includes logic circuitry 252 that captures the state of the RxClk_A_samp, RxClk_A_samp_n, RxClk_d_A_samp, and RxClk_d_A_samp_n signals when a transmit Start_mPacket Delimiter command (Tx SMD) is detected. The transmit clock (TxClk) is not used to determine the offset because the transmit clock is generated directly from the internal local clock and does not have a guaranteed phase relationship to the communication transmit timing. Thus, the offset of the internal local clock from the neighbor node is still derived from the RxClk and RxClk_d signals, but the offset coded vector is captured based on the timing of the Tx SMD over the transmit path. This technique is applicable to calculate a receive or transmit timestamp offset for 1000Base-T type PHYs regardless of whether the PHY is a clock master node or clock subordinate node on the network link.

Figure 4:
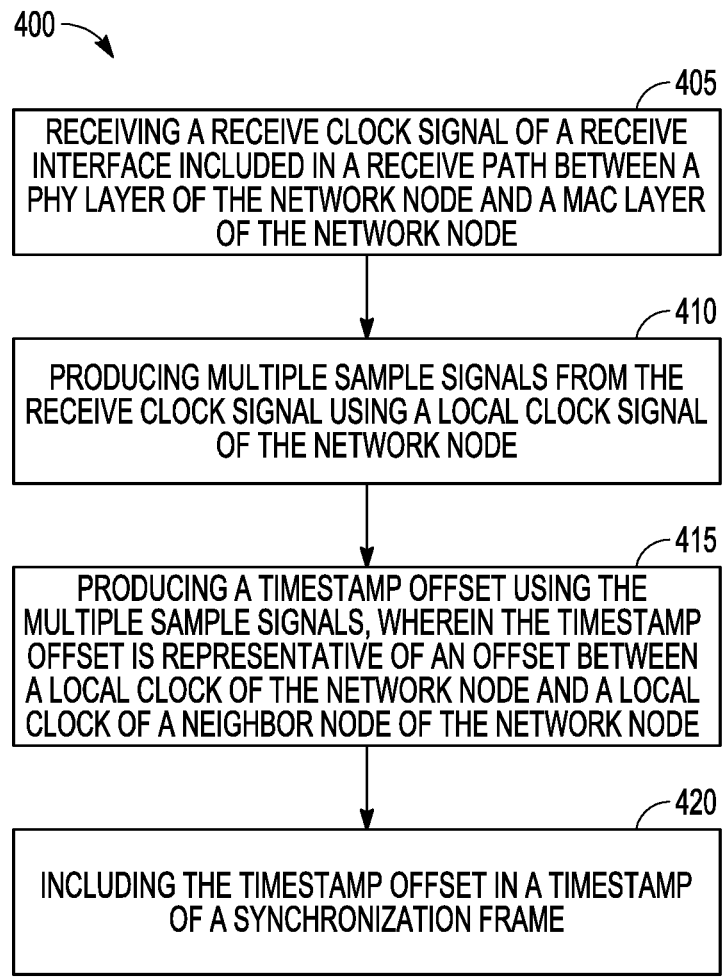
FIG. 4 is a flow diagram of an example of operating a network node of an area network.

For completeness, FIG. 4 is a flow diagram 400 of an example of the technique of determining an improved timestamp offset of a network node. The network node includes a PHY and a switch. At block 405, the switch receives a receive clock signal from the PHY. The receive clock signal can be included in a receive interface (e.g., an RGMII) of a receive path between the PHY and the MAC of the switch.

At block 410, multiple sample signals are produced from the receive clock signal using a local clock signal of the network node. For example, the sample signals RxClk_A_samp, RxClk_A_samp_n, RxClk_d_A_samp, and RxClk_d_A_samp_n can be produced from the receive clock signal RxClk as in the example of FIG. 2.

At block 415, the timestamp offset is produced using the multiple sample signals. The timestamp offset is representative of an instantaneous phase offset between a local clock of the network node and a local clock of a neighbor node of the network node. At block 420, the MAC of the switch includes the timestamp offset in a timestamp of a synchronization frame. The timestamp can be a receive timestamp sent to the neighbor node or a transmit timestamp sent to the neighbor node or processed locally.

While the techniques described herein can improve the precision of timestamps of the receive and transmit path of a network node to a resolution of 2 nsec, the results can depend on the sampling accuracy of the timestamp circuitry. The sampling accuracy may be a function of one or more of the quality of internal local clock, the quality of the DLL 240, and the timing relationships of the paths of RxClk and RxClk_d signals (both rising and falling edges) through the synchronizing flip-flops 242 and 244.

For network nodes with an RGMII 124 as in FIG. 1, a DLL 240 is available, and the receive clock RxClk and a delayed receive clock RxClk_d are available to generate the sample signals. For an MII, the transmit clock TxClk may be available from the PHY 112. In this case, a second DLL can be added to generate a delayed transmit clock TxClk_d, and the TxClk, TxClk_d, and the internal local clock can be used to generate the sample signals and the coded vectors.

For 100Base-TX type PHYs, the techniques described need to be somewhat modified. There are two important differences between 1000Base-T type PHYs and 100Base-TX type PHYs; a lower clock frequency and different clocks for the transmit and receive paths of the PHY.

The difference in frequencies amounts to the period on the sample signals being several times the frequency of the sampling by the internal local clock. Thus, some of the samples are around edges, while others are not. If both edges of the sampling clock fall within a period where both input signals are unchanged, then it does not necessarily provide information for the calculation of the offset. More information is needed to determine whether to update the timestamp offset calculation in these cases.

For a 100Base-TX type PHY, there is not enough information to determine the timestamp offset for the coded vectors 0b0000 and 0b1111. This is because there will be multiple instances of one or more other vectors between each edge of the sampled signal. However, these coded vectors should not be ignored because the internal local clock may indeed be running at a 2-4 nsec offset from the RxClk.

Figure 5:
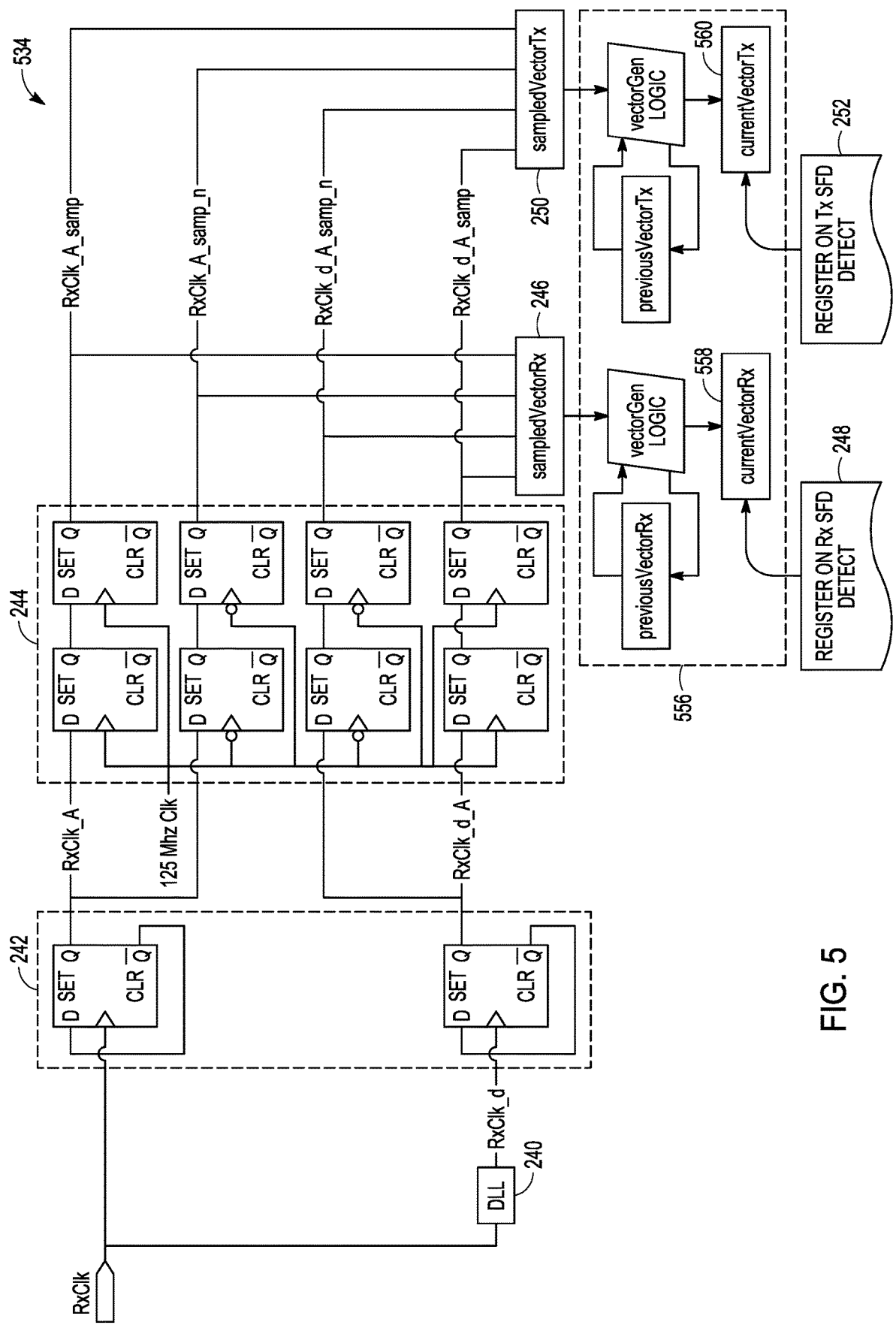
FIG. 5 is a circuit diagram of another example of timestamp circuitry of a network node.

FIG. 5 is a circuit diagram of an example of timestamp circuitry 534 that produces a timestamp offset for a network node with a 100Base-TX type PHY. The timestamp circuitry 534 includes additional logic circuitry 556 to track the value of the previous sampled vector in the timestamp offset register (246 or 250). This additional logic circuitry 556 checks the state of the current sampled vector value and the previous sampled vector value. If the sampled vector value (register 246 or 250) is all 0's and the previous sampled vector value was all 1's, the current vector value register (558 or 560) is set to all 0's. If the sampled vector value (register 246 or 250) is all 1's and the previous sampled vector value was all 0's, the current vector value register (558 or 560) is set to all 1's. If the sampled vector value (register 246 or 250) is not all 0's or all 1's, the current vector value register (558 or 560) is set to the sampled vector value (register 246 or 250).

Figure 6A:
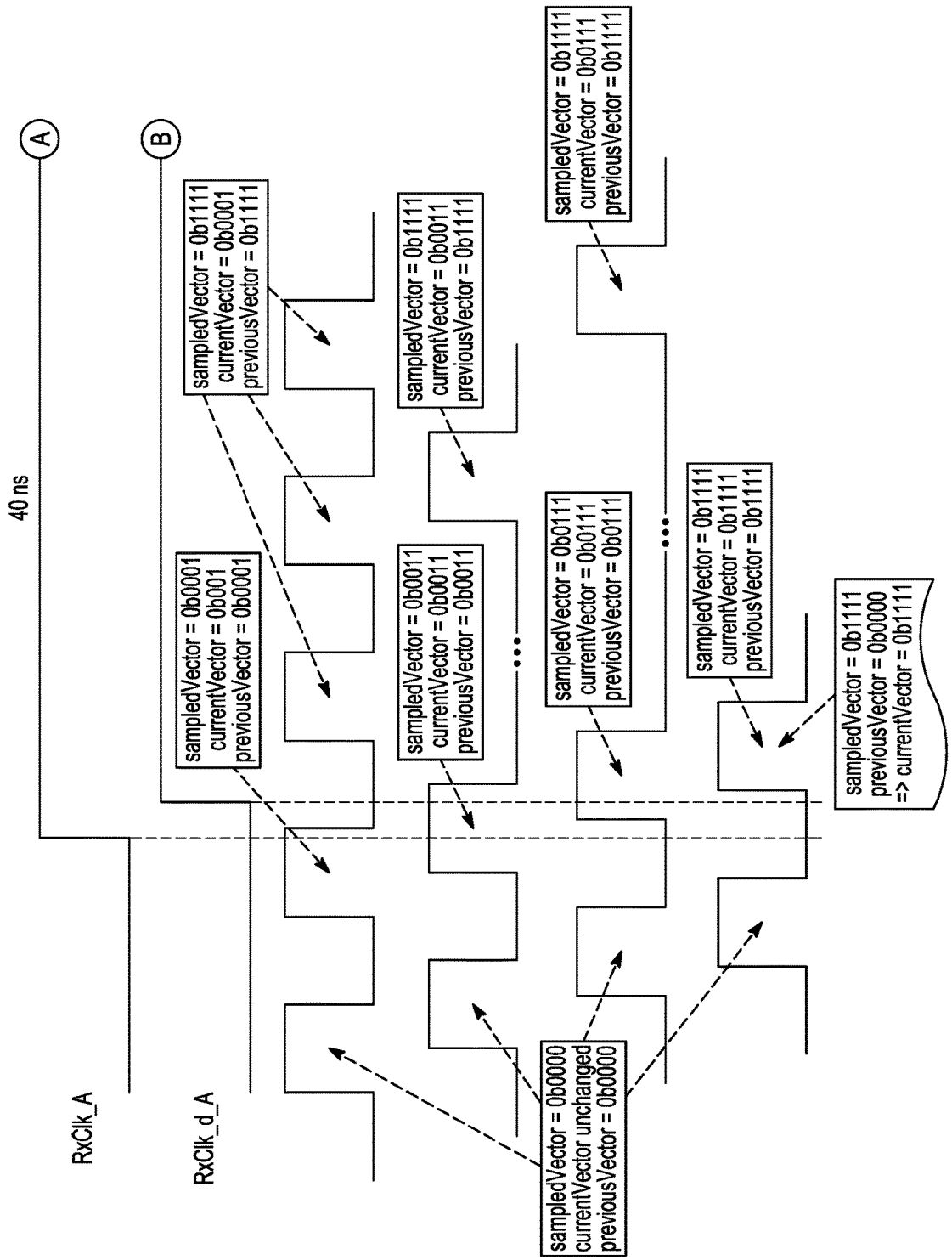

FIGS. 6A-6B illustrate signal waveforms of a 100Base-TX type PHY for the various cases of offsets between the internal local clock and the RxClk_A and RxClk_d_A signals. Also shown are the coded vector values corresponding to the offsets. The cases where the sample signals span across the transitions with all 0's or all 1's show dependence on the value of the previous coded vector.

Another difference for the 100Base-TX case is that the transmit clock TxClk and the receive clock RxClk are not related. When the PHY of the network node is a 100Base-TX type PHY, a common clock source should be used for the internal local clock of the switch 114 and the PHY 112 of a network node so that they have a fixed phase relationship. An option is to use the coded vector approach described herein to improve precision of the timestamp on the receive path and use the internal local clock with no offset adjustment to the timestamp on the transmit path.

For 10Base-T type PHYs, the technique needs to be modified similarly to the 100Base-TX case. The additional logic circuitry 556, 558, 560 of FIG. 5 is used for sampled vector values of 0b0000 and 0b1111. Like the 100Base-TX case, coded vectors are used to determine an offset to enhance the timestamp of the receive path but not the transmit path.

For 10Base-T1L type PHYs, the clocking scheme is similar to the 100Base-T type PHYs and the transmit clock TxClk and the receive clock RxClk are related. The coded vector technique can be used to determine both an offset to enhance the timestamp of the receive path and an offset to enhance the timestamp of the transmit path. The additional logic circuitry 556, 558, 560 of FIG. 5 is needed for the sampled vector values of 0b0000 and 0b1111.

ADDITIONAL DESCRIPTION AND EXAMPLES

Example 1 includes subject matter (such as a network node device of an area network), comprising physical layer (PHY) circuitry configured to transmit and receive frames of data via a communication link of the communication network; medium access layer (MAC) circuitry; a receive interface between the PHY circuitry and the MAC circuitry, wherein the receive interface includes a receive clock signal and a delay locked loop (DLL); and timestamp circuitry. The timestamp circuitry is configured to: produce multiple sample signals derived from the receive clock signal using the DLL and a local clock signal of the network node; and produce a timestamp offset using the multiple sample signals, wherein the timestamp offset is representative of an instantaneous phase offset between a local clock of the network node and a local clock of a neighbor node of the network node.

In Example 2, the subject matter of Example 1 optionally includes timestamp circuitry configured to: produce a delayed receive clock signal and produce a slowed receive clock signal having a lower frequency than the receive clock signal; sample the delayed and slowed receive clock signals with the local clock of the network node to produce the multiple sample signals; and determine the timestamp offset using the multiple sample signals.

In Example 3, the subject matter of Example 2 optionally includes the receive interface being a reduced gigabit media independent interface (RGMII) and the DLL is included in the RGMII, and timestamp circuitry configured to generate the delayed receive clock signal using the DLL of the RGMII.

In Example 4, the subject matter of one or both of Examples 2 and 3 optionally include timestamp circuitry is configured to produce a slowed-delayed receive clock signal; sample the slowed receive clock signal, the delayed receive clock signal, and the slowed-delayed receive clock signal to produce the multiple sample signals; produce a coded vector using the multiple sample signals; and determine the timestamp offset using the coded vector.

In Example 5, the subject matter of Example 4, optionally includes a timestamp offset register, and timestamp circuitry configured to detect a start frame delimiter sent by the PHY circuitry and store the coded vector in the timestamp offset register in response to the detection of the start frame delimiter.

In Example 6, the subject matter of one or both of Examples 4 and 5 optionally includes timestamp circuitry configured to determine the timestamp offset using a current value of the coded vector and a previous value of the coded vector.

In Example 7, the subject matter of one or any combination of Examples 1-6 optionally includes timestamp circuitry is configured to: detect a transmit start frame delimiter sent by the PHY circuitry; produce a transmit timestamp offset using the multiple sample signals of the receive clock signal; and store the transmit timestamp offset in response to the detection of the transmit start frame delimiter.

In Example 8, the subject matter of one or any combination of Examples 1-7 optionally includes timestamp circuitry configured to: detect a receive start frame delimiter sent by the PHY circuitry; produce a receive timestamp offset using the multiple sample signals of the receive clock signal; and store the receive timestamp offset in response to the detection of the transmit start frame delimiter.

In Example 9, the subject matter of one or any combination of Examples 1-8 optionally includes the frequency of the local clock signal of the network node being 125-megahertz, and the resolution of the timestamp offset being two nanoseconds.

In Example 10, the subject matter of one or any combination of Examples 1-9 optionally includes MAC circuitry is configured to include the timestamp offset in a timing frame to be transmitted by the network node device.

Example 11 includes subject matter (such as a method of operating a network node of an area network, or can optionally be combined with one or any combination of Examples 1-10 to include such subject matter, comprising receiving a receive clock signal of a receive interface included in a receive path between physical layer (PHY) circuitry of the network node and medium access layer (MAC) circuitry of the network node; producing multiple sample signals from the receive clock signal using a DLL of the receive interface and a local clock signal of the network node; producing a timestamp offset using the multiple sample signals, wherein the timestamp offset is representative of an offset between a local clock of the network node and a local clock of a neighbor node of the network node; and including, by a process of the network node, the timestamp offset in a timestamp of a timing frame to be transmitted by the network node.

In Example 12, the subject matter of Example 11 optionally includes generating a delayed receive clock signal and a slowed receive clock signal; sampling the delayed and slowed receive clock signals with the local clock of the network node to produce the multiple sample signals; and determining the timestamp offset using the multiple sample signals.

In Example 13, the subject matter of Example 12 optionally includes receiving a clock signal of a reduced gigabit media independent interface (RGMII), and generating the delayed receive clock signal using a delay locked loop (DLL) of the RGMII.

In Example 14, the subject matter of one or both of Examples 12 and 13 optionally includes generating a slowed receive clock signal, a delayed receive clock signal, and a slowed-delayed receive clock signal; sampling the slowed receive clock signal, the delayed receive clock signal and the slowed-delayed receive clock signal to produce the multiple sample signals; producing a coded vector using the multiple sample signals; and determining the timestamp offset using the coded vector.

In Example 15, the subject matter of Example 14 optionally includes storing the coded vector in response to detecting a start frame delimiter sent by the PHY circuitry to the MAC circuitry.

In Example 16, the subject matter of one or both of Examples 14 and 15 optionally includes determining the timestamp offset using a current value of the coded vector and a previous value of the coded vector.

In Example 17, the subject matter of one or any combination of Examples 11-16 optionally includes producing a transmit timestamp offset using the multiple sample signals.

In Example 18, the subject matter of one or any combination of Examples 11-17 optionally includes producing a receive timestamp offset using the multiple sample signals.

Example 19 includes subject matter (such as a network device of an area network) or can optionally be combined with one or any combination of Examples 1-18 to include such subject matter, comprising medium access layer (MAC) circuitry; a reduced gigabit media independent interface (RGMII) operatively coupled to the MAC circuitry, wherein the RGMII includes a delay locked loop (DLL) circuit and receives a receive clock signal having a first frequency from a physical layer (PHY); and timestamp circuitry. The timestamp circuitry configured to produce a delayed receive clock signal using the DLL circuit of the RGMII and produce a slowed receive clock signal having a lower frequency than the first frequency; sample the receive clock signal, the delayed receive clock signal, and the slowed receive clock signal, to produce multiple sample signals; produce a timestamp offset using the multiple sample signals, wherein the timestamp offset is representative of an offset between a local clock of the network node and a local clock of a neighbor node of the network node; and wherein the MAC circuitry is configured to include the timestamp offset in a timestamp of a timing frame for transmission by the network node device.

In Example 20, the subject matter of Example 19 optionally includes timestamp circuitry configured to produce a coded vector using the multiple sample signals; and determine the timestamp offset using the coded vector.

These non-limiting Examples can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A network node device of an area network, the network node device comprising:
   physical layer (PHY) circuitry configured to transmit and receive frames of data via a communication link of the communication network;
   medium access control layer (MAC) circuitry;
   a receive interface between the PHY circuitry and the MAC circuitry, wherein the receive interface includes a receive clock signal and a delay locked loop (DLL); and
   timestamp circuitry configured to:
   produce multiple sample signals derived from the receive clock signal using the DLL and a local clock signal of the network node; and
   produce a timestamp offset using the multiple sample signals, wherein the timestamp offset is representative of an instantaneous phase offset between the local clock signal of the network node and a local clock signal of a neighbor node of the network node.

2. The network node device of claim 1, wherein the timestamp circuitry is configured to:
   produce a delayed receive clock signal and produce a slowed receive clock signal having a lower frequency than the receive clock signal;
   sample the delayed and slowed receive clock signals with the local clock signal of the network node to produce the multiple sample signals; and
   determine the timestamp offset using the multiple sample signals.

3. The network node device of claim 2,
   wherein the receive interface is a reduced gigabit media independent interface (RGMII) and the DLL is included in the RGMII; and wherein the timestamp circuitry is configured to generate the delayed receive clock signal using the DLL of the RGMII.

4. The network node device of claim 2, wherein the timestamp circuitry is configured to:
produce a slowed-delayed receive clock signal;
sample the slowed receive clock signal, the delayed receive clock signal, and the slowed-delayed receive clock signal to produce the multiple sample signals;
produce a coded vector using the multiple sample signals; and
determine the timestamp offset using the coded vector produced using the multiple sample signals.

5. The network node device of claim 4, including:
a timestamp offset register; and
wherein the timestamp circuitry is configured to detect a start frame delimiter sent by the PHY circuitry and store the coded vector in the timestamp offset register in response to the detection of the start frame delimiter.

6. The network node device of claim 4, wherein the timestamp circuitry is configured to determine the timestamp offset using a current value of the coded vector and a previous value of the coded vector.

7. The network node device of claim 1, wherein the timestamp circuitry is configured to:
detect a transmit start frame delimiter sent by the PHY circuitry;
produce a transmit timestamp offset using the multiple sample signals of the receive clock signal; and
store the transmit timestamp offset in response to the detection of the transmit start frame delimiter.

8. The network node device of claim 1, wherein the timestamp circuitry is configured to:
detect a receive start frame delimiter sent by the PHY circuitry;
produce a receive timestamp offset using the multiple sample signals of the receive clock signal; and
store the receive timestamp offset in response to the detection of the transmit start frame delimiter.

9. The network node device of claim 1, wherein a frequency of the local clock signal of the network node is 125-megahertz, and a resolution of the timestamp offset is two nanoseconds.

10. The network node device of claim 1, wherein the MAC circuitry is configured to include the timestamp offset in a timing frame to be transmitted by the network node device.

11. A method of operating a network node of an area network, the method comprising:
receiving a receive clock signal of a receive interface included in a receive path between physical layer (PHY) circuitry of the network node and medium access control layer (MAC) circuitry of the network node;
producing multiple sample signals from the receive clock signal using a delay locked loop (DLL) of the receive interface and a local clock signal of the network node;
producing a timestamp offset using the multiple sample signals, wherein the timestamp offset is representative of an offset between local clock signal of the network node and a local clock of a neighbor node of the network node; and
including, by a process of the network node, the timestamp offset in a timestamp of a timing frame to be transmitted by the network node.

12. The method of claim 11, wherein producing the timestamp offset includes:

generating a delayed receive clock signal and a slowed receive clock signal;
sampling the delayed and slowed receive clock signals with the local clock signal of the network node to produce the multiple sample signals; and
determining the timestamp offset using the multiple sample signals.

13. The method of claim 12,
wherein receiving a receive clock signal of a receive interface includes receiving a clock signal of a reduced gigabit media independent interface (RGMII); and
wherein generating the delayed receive clock signal includes generating the delayed receive clock signal using a delay locked loop (DLL) of the RGMII.

14. The method of claim 12,
wherein generating the delayed and slowed versions of the receive clock signal includes generating a slowed receive clock signal, a delayed receive clock signal, and a slowed-delayed receive clock signal;
wherein the sampling includes sampling the slowed receive clock signal, the delayed receive clock signal, and the slowed-delayed receive clock signal to produce the multiple sample signals; and producing a coded vector using the multiple sample signals; and
wherein determining the timestamp offset includes determining the timestamp offset using the coded vector produced using the multiple sample signals.

15. The method of claim 14, wherein producing the coded vector includes storing the coded vector in response to detecting a start frame delimiter sent by the PHY circuitry to the MAC circuitry.

16. The method of claim 14, wherein determining the timestamp offset includes determining the timestamp offset using a current value of the coded vector and a previous value of the coded vector.

17. The method of claim 11, wherein producing the timestamp offset includes producing a transmit timestamp offset using the multiple sample signals.

18. The method of claim 11, wherein producing the timestamp offset includes producing a receive timestamp offset using the multiple sample signals.

19. A network node device of an area network, the network node device comprising:
medium access control layer (MAC) circuitry;
a reduced gigabit media independent interface (RGMII) operatively coupled to the MAC circuitry, wherein the RGMII includes a delay locked loop (DLL) circuit and receives a receive clock signal having a first frequency from a physical layer (PHY); and
timestamp circuitry configured to:
produce a delayed receive clock signal using the DLL circuit of the RGMII and produce a slowed receive clock signal having a lower frequency than the first frequency;
sample the receive clock signal, the delayed receive clock signal, and the slowed receive clock signal, to produce multiple sample signals;
produce a timestamp offset using the multiple sample signals, wherein the timestamp offset is representative of an offset between a local clock signal of the network node and a local clock signal of a neighbor node of the network node; and
wherein the MAC circuitry is configured to include the timestamp offset in a timestamp of a timing frame for transmission by the network node device.

20. The network node device of claim 19, wherein the timestamp circuitry is configured to:

produce a coded vector using the multiple sample signals; and determine the timestamp offset using the coded vector produced using the multiple sample signals.

* * * * *